United States Patent
Wascat et al.

(10) Patent No.: US 10,551,243 B2
(45) Date of Patent: Feb. 4, 2020

(54) POWER EFFICIENT MACHINE DIAGNOSTIC MONITORING USING MULTIPLE VIBRATION SENSOR WIRELESS CONFIGURATION

(71) Applicant: 01dB-Metravib, Societe par Actions Simplifiee, Limonest (FR)

(72) Inventors: Bertrand Wascat, Limas (FR); Thierry Mazoyer, Auzelles (FR); Patrick Labeyrie, Dardilly (FR); Guillaume Lavaure, Limas (FR); Philippe Poizat, Marcilly D'azergues (FR)

(73) Assignee: ACOEM France (FR)

( * ) Notice: Subject to any disclaimer, the term of this patent is extended or adjusted under 35 U.S.C. 154(b) by 501 days.

(21) Appl. No.: 15/361,980

(22) Filed: Nov. 28, 2016

(65) Prior Publication Data
US 2018/0149516 A1    May 31, 2018

(51) Int. Cl.
*G01H 1/00* (2006.01)
*G01K 13/00* (2006.01)
(Continued)

(52) U.S. Cl.
CPC ............... *G01H 1/00* (2013.01); *G01K 3/005* (2013.01); *G01K 13/00* (2013.01); *H04W 4/38* (2018.02);
(Continued)

(58) Field of Classification Search
CPC ........... G01H 1/00; G01H 1/003; H04W 4/38; H04W 4/70; G01K 3/005; G01K 13/00;
(Continued)

(56) References Cited

U.S. PATENT DOCUMENTS 4,768,380 A    9/1988 Vermeiren et al.
5,633,811 A    5/1997 Canada et al.
(Continued)

FOREIGN PATENT DOCUMENTS

CN    205138636 U  *  4/2016

OTHER PUBLICATIONS

English machine translation of Guo Lei et al. (CN 205138636 U) (Year: 2016).*

*Primary Examiner* — David M. Gray
*Assistant Examiner* — Geoffrey T Evans
(74) *Attorney, Agent, or Firm* — Jordan and Koda, PLLC

(57) ABSTRACT

A wireless monitoring unit performs condition monitoring associated with a test point location of a host machine. The unit includes a high performance vibration sensor useful for monitoring the host machine for fault conditions and the like. The unit includes a second vibration sensor that has poorer metrological performance, but draws a comparatively insignificant amount of power from the battery. The second sensor takes a vibration measure periodically, which measure is processed to evaluate whether the machine is in a state eligible to undergo a health assessment. Diagnostic monitoring using the high performance vibration sensor is enabled only when the host machine it is in the eligible state. A low power temperature sensor provides additional data for guarding against a false trigger, in effect allowing the processor to distinguish against vibration from another machine propagating to the host machine causing the host machine to vibrate while the host machine is not running.

20 Claims, 7 Drawing Sheets

(51) Int. Cl.
  *H04W 4/70* (2018.01)
  *G01M 13/045* (2019.01)
  *G05B 23/02* (2006.01)
  *H04W 4/38* (2018.01)
  *G01K 3/00* (2006.01)
  *G08C 17/02* (2006.01)
  *G01M 1/28* (2006.01)
  *G01M 13/028* (2019.01)
  *G08C 17/00* (2006.01)
  *G01M 15/12* (2006.01)

(52) U.S. Cl.
  CPC .............. *H04W 4/70* (2018.02); *G01H 1/003* (2013.01); *G01M 1/28* (2013.01); *G01M 13/028* (2013.01); *G01M 13/045* (2013.01); *G01M 15/12* (2013.01); *G05B 23/0221* (2013.01); *G08C 17/00* (2013.01); *G08C 17/02* (2013.01); *Y02D 70/00* (2018.01); *Y02D 70/10* (2018.01); *Y02D 70/142* (2018.01); *Y02D 70/144* (2018.01); *Y02D 70/162* (2018.01); *Y02D 70/166* (2018.01); *Y02D 70/22* (2018.01)

(58) Field of Classification Search
  CPC ......... G08C 17/00; G08C 17/02; G01M 1/28; G01M 13/028; G01M 13/045; G01M 15/12; G05B 23/0221
  See application file for complete search history.

(56) References Cited

U.S. PATENT DOCUMENTS

| | | | |
|---|---|---|---|
| 5,679,900 A | 10/1997 | Smulders | |
| 5,845,230 A | 12/1998 | Lamberson | |
| 5,854,553 A | 12/1998 | Barclay et al. | |
| 5,854,994 A | 12/1998 | Canada et al. | |
| 5,870,699 A | 2/1999 | Canada et al. | |
| 5,875,420 A | 2/1999 | Piety et al. | |
| 5,907,491 A | 5/1999 | Canada et al. | |
| 5,922,963 A | 7/1999 | Piety et al. | |
| 5,943,634 A | 8/1999 | Piety et al. | |
| 5,992,237 A | 11/1999 | McCarty et al. | |
| 6,006,164 A | 12/1999 | McCarty et al. | |
| 6,078,874 A | 6/2000 | Piety et al. | |
| 6,124,692 A | 9/2000 | Canada et al. | |
| 6,138,078 A | 10/2000 | Canada et al. | |
| 6,192,325 B1 | 2/2001 | Piety et al. | |
| 6,199,422 B1 | 3/2001 | Boerhout et al. | |
| 6,202,491 B1 | 3/2001 | McCarty et al. | |
| 6,275,781 B1 | 8/2001 | Maness et al. | |
| 6,301,514 B1 | 10/2001 | Canada et al. | |
| 6,437,692 B1 | 8/2002 | Petite et al. | |
| 6,489,884 B1 | 12/2002 | Lamerson et al. | |
| 6,513,386 B2 | 2/2003 | Barclay | |
| 6,633,822 B2 | 10/2003 | Maness et al. | |
| 6,789,025 B2 | 9/2004 | Boerhout | |
| 6,792,360 B2 | 9/2004 | Smulders et al. | |
| 6,862,351 B2 | 3/2005 | Taylor | |
| 7,103,511 B2 | 9/2006 | Petite | |
| 7,142,990 B2 | 11/2006 | Bouse et al. | |
| 7,313,484 B2 | 12/2007 | Lindberg et al. | |
| 7,324,919 B2 | 1/2008 | Lindberg et al. | |
| 7,458,269 B2 | 12/2008 | Loesl et al. | |
| 7,697,492 B2 | 4/2010 | Petite | |
| 7,711,519 B2 | 6/2010 | Lindberg et al. | |
| 7,805,281 B2 | 9/2010 | Leigh | |
| 8,174,402 B2 | 5/2012 | Bouse et al. | |
| 8,223,121 B2 * | 7/2012 | Shaw | G06F 3/0346 345/158 |
| 8,370,109 B2 | 2/2013 | Van Dyke et al. | |
| 9,913,006 B1 * | 3/2018 | Wascat | H04W 4/70 |
| 2003/0172738 A1 * | 9/2003 | Poizat | G01N 29/14 73/660 |
| 2010/0074157 A1 * | 3/2010 | Doh | H04W 84/18 370/311 |
| 2013/0080811 A1 * | 3/2013 | Low | G06F 3/033 713/323 |
| 2013/0321006 A1 * | 12/2013 | Weingaertner | B60R 25/2054 324/679 |
| 2014/0024392 A1 * | 1/2014 | Su | H04W 4/025 455/456.2 |
| 2014/0045537 A1 * | 2/2014 | Luther | H04W 4/026 455/456.6 |
| 2014/0069951 A1 * | 3/2014 | Schmidt | A47K 5/1217 221/13 |
| 2014/0121996 A1 | 5/2014 | Piety et al. | |
| 2014/0299416 A1 * | 10/2014 | Jakes | B66B 9/0838 187/201 |
| 2016/0016445 A1 * | 1/2016 | Peine | B60C 23/0494 73/146.5 |
| 2016/0041068 A1 * | 2/2016 | Wascat | G01M 99/005 702/39 |
| 2016/0041070 A1 * | 2/2016 | Wascat | G05B 23/024 702/183 |
| 2016/0054773 A1 * | 2/2016 | Gulati | G06F 1/3203 713/300 |
| 2016/0054788 A1 * | 2/2016 | Gulati | G06F 1/3296 713/323 |
| 2017/0115739 A1 * | 4/2017 | Wei | G06F 3/017 |

* cited by examiner

POWER EFFICIENT MACHINE DIAGNOSTIC MONITORING USING MULTIPLE VIBRATION SENSOR WIRELESS CONFIGURATION

RELATED SPECIFICATION

This application is related to commonly-assigned, U.S. patent application Ser. No. 15/361,883 of Wascat et al. filed on the same day for "Power-Efficient Data-Load-Efficient Method of Wirelessly Monitoring Rotating Machines," and is incorporated herein in its entirety by reference. The specification of commonly-assigned, U.S. patent application Ser. No. 14/451,777 of Wascat et al. filed on Aug. 4, 2014 for Automatic Rotating-Machine Fault Diagnosis With Confidence Level Indication" is incorporated herein in its entirety by reference

BACKGROUND OF THE INVENTION

This invention relates generally to the collection and analysis of machine diagnostic data, such as vibration data, temperature, and rotation speed. More particularly, this invention relates to a wireless monitoring unit installed at a rotating machine for collecting and analyzing machine diagnostic data.

Many types of machines are used in a production or manufacturing facility, such as in the production of consumer and industrial goods and in the delivery of basic utility services. Because of the importance of these machines in meeting production and service requirements, taking a machine offline unexpectedly due to a failure can be costly. Accordingly, it is desirable to implement an effective predictive maintenance program to keep the machines in good working condition. Of concern is that a machine part that is moving or being moved against eventually may fatigue or otherwise become compromised or defective resulting in decreased machine performance and reliability. Eventually if a deteriorating condition is not detected a failure may occur. Examples of machines for which it is desirable to collect data for preventive maintenance are motors, pumps, generators, compressors, lathes and other machines having rotating or other moving parts, such as a shaft, rotor, or bearings.

Most predictive maintenance programs include the periodic collection of machine data, such as vibration data, rotation speed, noise, and temperature. Vibration data is sensed using an accelerometer. Rotation is sensed using a tachometer. Temperature is sensed using a temperature sensor. Data acquisition previously has involved an operator carrying a data collection unit, sensors, and cables from machine to machine. A sensor is mounted at a test point on a given machine, then coupled to the data collection unit by a cable. The operator then operates the data collection unit to gather the data. The operator performs a route of a facility to gather data from one or more test points of one or more machines. Typically, the data then is uploaded from the data collection unit to a data analysis system where condition monitoring is performed, so as to provide early fault detection and efficiently schedule maintenance of a machine.

Wireless sensors have reduced the need for an operator to carry cables along a data collection route, thereby making data collection more efficient and safer. Wireless sensors even have been permanently installed at machine test points. However, implementation of permanent sensors in an effective manner has been a challenge. In particular, the operational demands of the sensors results in a significant drain on the battery, resulting in an undesirably short battery life. Such compromised battery life has been an obstacle against achieving reliable data collection. Further, reduced sensor accuracy when the battery power gets too low, along with missed fault conditions due to a failed battery are significant problems. These problems have been addressed in an inefficient manner by changing the battery every few months. Such frequent attention to the sensor unit by a technician on site severely compromises the benefit of having a permanently installed sensor unit.

Accordingly, there is a need for a more efficient sensor unit that can effectively monitor machine diagnostics while being permanently installed at a machine. These and other needs are addressed by various embodiments of the present invention.

SUMMARY OF THE INVENTION

According to the invention, a wireless monitoring unit (WMU) includes a high performance vibration sensor, (e.g., a piezoelectric accelerometer), and a low power vibration sensor, (e.g., a MEMS device). The low power vibration sensor collects a vibration sample periodically, which sample is processed to discern whether the host machine is in a state eligible for undergoing a health assessment, (e.g., the host machine is running). The high performance vibration sensor is activated to collect vibration data only when the machine is found to be eligible for undergoing a health assessment.

The WMU includes diagnostic sensors, a processor, memory, multiple communication modules, and a battery. Among the sensors is the high performance vibration sensor. In a preferred embodiment such sensor is an accelerometer useful for sensing the machine's vibration in the different axes, (e.g., one accelerometer unit measuring in 3 axes; 3 accelerometers measuring in a respective one axis of x, y, and z axes.) With regard to the performance level, a high performance vibration sensor, as the term is used herein, is one that has technical specification ratings that meet the metrological requirements for vibration measurements used to perform condition monitoring and diagnosis of the host machine. Such requirements of the host machine are known. Other diagnostic sensors, such as a temperature sensor and an acoustic sensor, and sensing devices for monitoring speed, power, oil quality, and displacement also may be included.

Of significance is that a second vibration sensor also is included in the WMU. The second vibration sensor is a low power vibration sensor. As used herein, a low power vibration sensor is one that draws less than 0.1 µAh of power from the battery for a 5 second sampling of vibration data.

To effectively monitor a host machine, a health assessment is performed periodically. The interval between health assessments depends on the type of host machine. For many rotating machines, a health assessment is performed once per day.

According to an aspect of this invention, a vibration measurement is performed by the low power vibration sensor substantially more often than by the high performance vibration sensor. In an example embodiment, the low power vibration measurement performs a vibration measurement continuously or periodically (e.g., every 1 second (or shorter interval) to every 5 minutes). Such vibration measurement includes the collection of a sample set of vibration data. The processor analyzes such sample set to make a decision as to whether the host machine is running, so as to be eligible for undergoing a health assessment.

According to another aspect of this invention, as a precondition to collecting vibration data from the high performance vibration sensor, the state of the machine is tested using the low power vibration sensor. If, for example, the host machine is running, then vibration data is collected from the high performance vibration sensor for use in performing a health assessment of the test point of the host machine at which the WMU is installed.

In some embodiments of the invention, temperature data also is used by the processor to form the decision as to whether the host machine is running. In industrial environments, some machines can be installed near—or even next to—each other. As a result, the vibrations generated by one machine can propagate to nearby machines. It is desirable that the processor avoid determining that the host machine is running when it is not running. To avoid mistaking vibrations propagating to the host machine from another machine as being vibrations of the host machine in a running state, in some embodiments temperature data also is analyzed. Accordingly, a low power temperature sensor also may be included. A low power temperature sensor, as the term is used herein, is one that does draws less than 0.1 µAh of power from the battery to collect a temperature sample.

The processor monitors the low power temperature sensor to identify a select temperature parameter. In one embodiment, the processor determines whether the temperature has reached a threshold temperature (e.g., less than the threshold; greater than the threshold). In another embodiment, the processor determines whether the temperature change over a select time period exceeds a select temperature deviation threshold.

In some embodiments of the invention, the low power vibration sensor is a low performance vibration sensor. A low performance vibration sensor, as the term is used herein, is one that has technical specification ratings that do not meet the metrological requirements for the respective vibration measurements used to perform condition monitoring and diagnosis of the host machine. For example, the accuracy of the low performance vibration sensor may be poor resulting in the sensor output deviating over time for a same vibration input. To reduce the adverse impact of such tendency to deviate, the low performance vibration sensor is recalibrated periodically. In an exemplary embodiment, for each test point health assessment in which a new set of vibration data is collected using the high performance vibration sensor, the processor checks the low performance vibration sensor to determine whether to recalibrate the low power vibration sensor.

The inventions will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details may be set forth, such as particular terminals, devices, components, techniques, protocols, interfaces, hardware, etc. in order to provide a thorough understanding of the present invention. However, it will be apparent to one skilled in the art that the present invention may be practiced in other embodiments that depart from these specific details. Detailed descriptions of well-known computers, terminals, devices, phones, components, techniques, protocols, interfaces, and hardware are omitted so as not to obscure the description of the present invention. Accordingly, computer components and other components, protocols, and interfaces, known to one of ordinary skill in the art of machine vibration data collection and analysis are intended to be inferred into the detailed description. The terms fault and defect are used interchangeably herein, and are not intended to have a different meaning.

Machine Diagnostic Data Acquisition Environment

Figure 1:
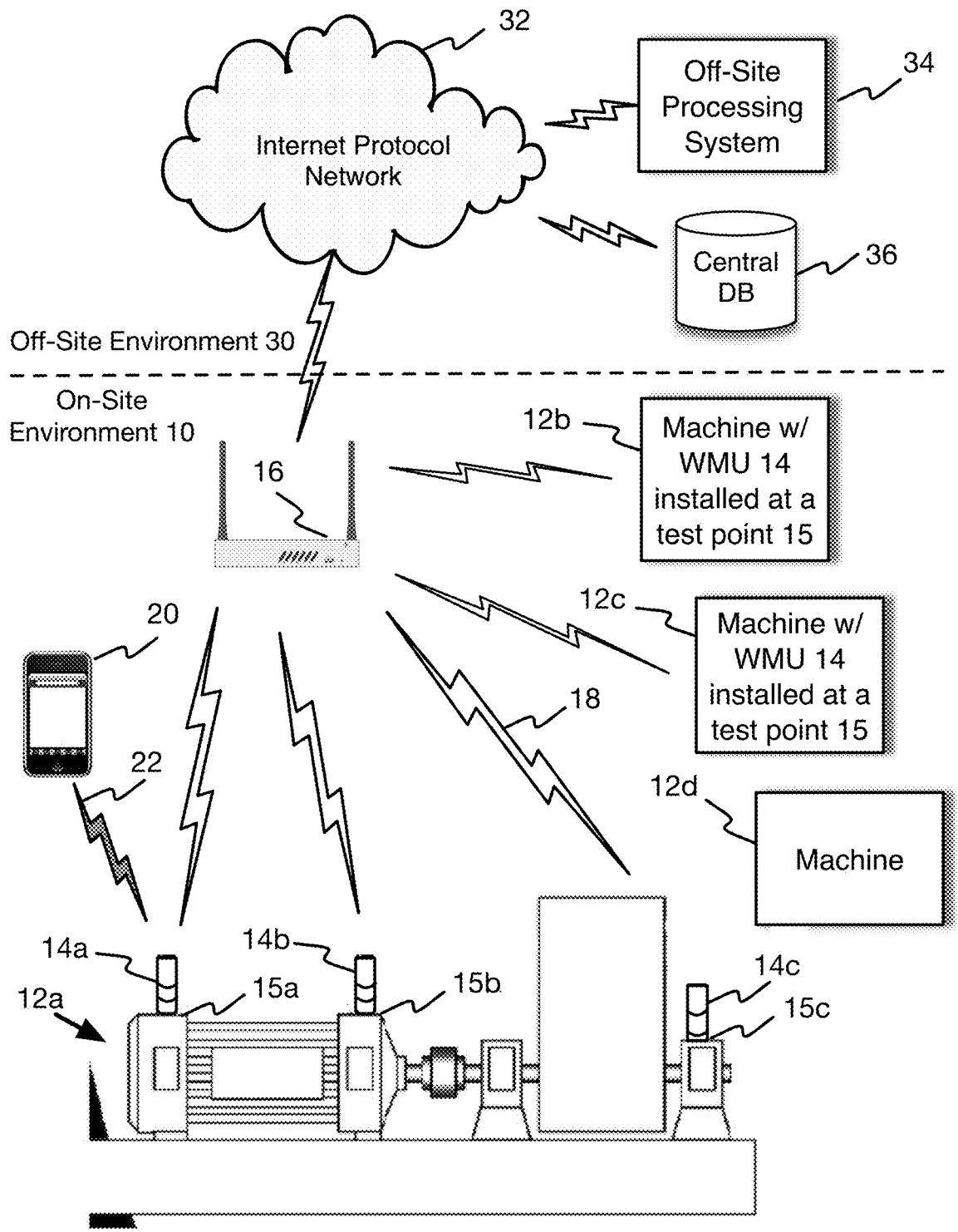
FIG. 1 is a diagram of an exemplary environment for a machine diagnostic network environment that utilizes a wireless monitoring unit (WMU) according to an embodiment of this invention.

FIG. 1 shows a machine diagnostic data acquisition environment according to an embodiment of this invention. The environment includes an on-site data acquisition network environment 10 and an off-site network environment 30. On-site are one or more machines 12. Typically, there are multiple machines in an industrial facility. The specific number of machines may vary. Depicted is an on-site environment having four machines 12a-12d. A machine hosting a wireless monitoring unit (WMU) 14 has part(s) that move or are moved against, such as a shaft, rotor, bearings, and gears. For example, machines 12a-12d may include a motor, a pump, a generator, a compressor, and/or a lathe. To keep the machines in good working condition and monitor for decreased performance or reliability over time, condition monitoring and automatic diagnosis is performed. Various indicators of diagnostic performance are derived from acquired diagnostic data to perform the condition monitoring. In particular, fault detection, alarm conditions, or other defect or impending-defect conditions are identified so as to schedule a maintenance operation. The benefits are immediate as the predictive maintenance scheduling avoids production losses and reduces maintenance costs (e.g., spare part management is more efficient; maintenance can focus on the defective component only; collateral damage to other components of the machine can be avoided).

The machine diagnostic data acquisition on-site network environment 10 provides a solution for monitoring machine assets of a company. In particular data may be collected on-site and transmitted off-site for analysis by an off-site processing system 34. Alternatively, the data may be evaluated on-site by an on-site processing system (not shown). In a preferred embodiment, condition monitoring, including the derivation of indicator measures and application of criteria to the measures, leads to an automatic diagnosis determined by the WMU 14*a-c* mounted at respective test point 15*a-c* on the host machine 12*a*. For some monitored conditions, the condition may be of a type that a complete automatic diagnosis may be achieved based solely on the diagnostic data obtained from a given WMU 14 at a given test point 15 of the host machine 12. For other monitored conditions, diagnosis performed by an individual WMU 14*a* may be incomplete as data from other test points 15*b*, 15*c* may also be required to make an accurate diagnosis of the health of the host machine. According to an embodiment of the invention, the multiple WMUs 14*a*-14*c* communicate with each other to consolidate analysis of the respective test points 15*a*-15*c* to achieve condition monitoring and automatic diagnosis for the machine 12*a* as a whole, (i.e., at the machine level of analysis.) In an example embodiment, one WMU 14*a* is configured to receive analysis results from the other WMUs 14*b*-14*c* to perform consolidated condition monitoring and consolidated automatic diagnosis at the machine level of analysis.

Accordingly, automatic diagnosis is performed on-site, off-site, or both on-site and off-site. Typically, expert technicians also are relied on to view and interpret results or trends in results. Accordingly, results of automatic diagnosis are transmitted to a central database 36 in the off-site environment 30. In an example embodiment, automatic diagnosis includes vibration analysis, temperature analysis, shock measuring, spectrum analysis of shock results, fast Fourier transform analysis of vibration data, fault detection, tachometry, and other machine diagnostic and predictive maintenance analysis.

The WMU 14 communicates with the off-site processing system 34 and the central database 36 through a gateway 16 or other access point to an internet protocol network 32. Intermediary routing device(s) may be included in the on-site environment 10 for routing communications to the gateway 16 or other access point.

In various embodiments the off-site processing system 34 is a general-purpose computer, such as a workstation, desktop computer, laptop computer, or tablet computer. The processing system 34 includes a processor, a display device, one or more input devices (e.g., keys, buttons, keyboard, tablet keyboard, pointing device, stylus), volatile memory, non-volatile memory, and various input/output interfaces. The processing system 34 sends commands to each WMU 14 and receives responses from each WMU 14. Although not illustrated, an on-site processing system may be included in the on-site environment. The structure, configuration, and software for the on-site processing system is the same as described herein for the off-site processing system.

The off-site processing system 34 is configured to send various commands to the WMU 14. There are configuration commands used to command the WMU 14 to set configuration options and configuration parameters of the WMU 14 as per the command parameters. For example, the WMU may be configured to perform a test point health assessment periodically at a specified time interval (e.g., once per day). Various configuration parameters are described throughout the detailed description of preferred embodiments. There also are operational commands that request that the WMU 14 perform a specific operation, such as to perform a test point health assessment, perform a diagnostic data acquisition operation for a specified sensor or set of sensors, perform monitoring for a specific set of conditions, perform automatic diagnosis and related data acquisition for specific automatic diagnosis protocols. There are status check commands such as to request that the WMU send a status of the WMU battery, a status of whether the host machine is running, or other status information.

The processing system 34 receives acknowledgements, command responses, raw data, analysis results, conditions test results, automatic diagnosis results, and status information from the WMU 14.

The processing system 34 includes a processor that executes software made up of computer programs, databases, and other data constructs. Such software configures the processor and processing system 34 to send commands and process responses and other communications from the WMUs 14 of multiple machines 12 of one or more facilities.

Wireless Monitoring Unit 14

According to the invention, a wireless monitoring unit (WMU) 14 is installed on a machine 12. For example, a given machine 12*a* may have multiple wireless monitoring units 14*a-c* installed. Each one of multiple machines 12*a*-12*c* may have one or more wireless monitoring units 14 installed. In some environments there may be machines 12*a-c* having one or more WMUs 14 installed, and other machines 12*d* that do not have a WMU 14 installed.

Each WMU 14 includes a housing, an antenna, an on/off switch, sensors, a battery, and a circuit board with one or more circuit components mounted thereon. In a preferred embodiment each WMU 14 is permanently installed at a test location on a machine. By permanent, it is meant that the WMU 14 is to remain installed over a prolonged time period (of months) and will not be dislodged during normal machine operating conditions. It is expected that the battery of the WMU 14 will be replaced periodically, or as needed. In some embodiments the WMU 14 is mounted to the machine 12 with a magnet. In other embodiments, a fixture is used, such as a threaded post and correspondingly threaded receptacle. Accordingly, the WMU 14 also includes a mounting structure (such as a magnet, opening, or threaded member) that serves to facilitate mounting of the WMU 14 to the machine 12.

There are many benefits of the wireless monitoring unit 14, including:

Personnel safety is improved when wireless data acquisition in a hazardous area is achieved because a technician no longer needs to be nearby to facilitate data collection, New monitoring capabilities are achieved for testing that were not be achievable for monitoring with a wired sensor unit (e.g., the WMU can be located at test points that are inaccessible to a wired sensor unit; the WMU can be installed even on a machine that is mobile during monitoring.)

Data acquisition now is more cost effective in facilities where distances or facility environments made cabling costs prohibitive.

The monitoring solution is expandable. A facility can start a wireless monitoring program on a limited number of machines or test points, and easily expand monitoring to include other machines and test points by installing other WMUs.

Figure 2:
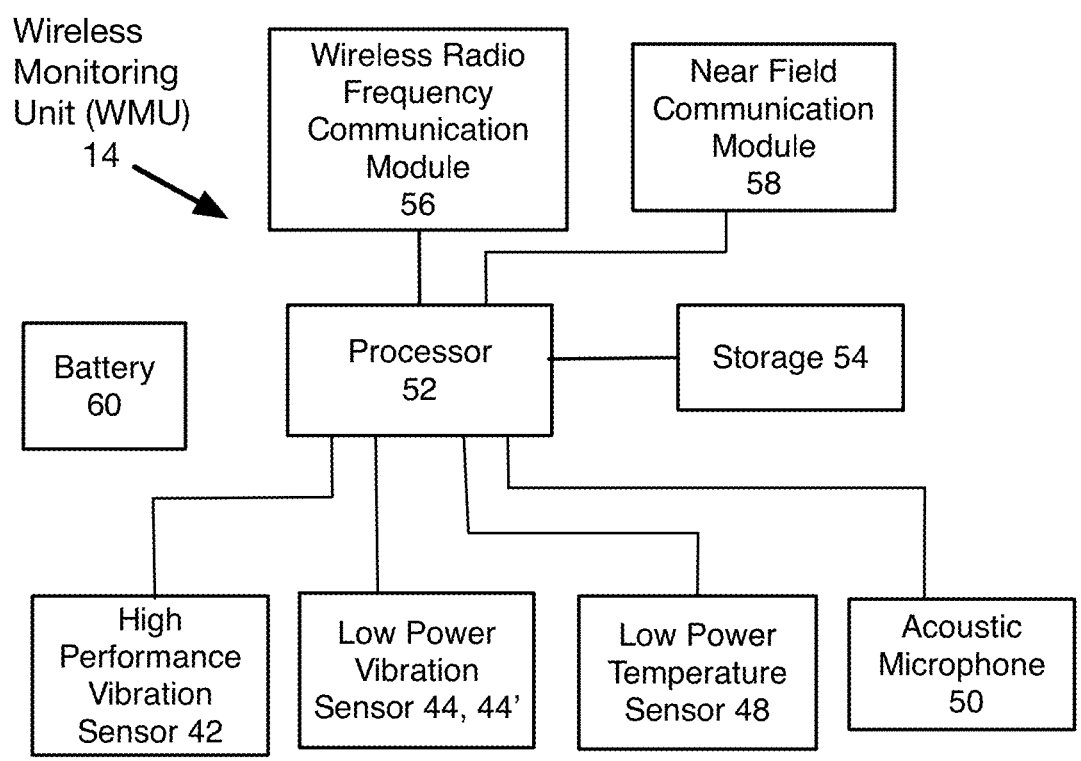
FIG. 2 is a block diagram of a WMU's electronics according to an embodiment of this invention.

FIG. 2 shows a block diagram of the WMU 14, according to an embodiment of the invention. The WMU 14 includes a high performance vibration sensor 42, a low power vibration sensor 44, a low power temperature sensor 48, an acoustic microphone 50, a processor 52, storage 54, a wireless radio frequency communication module 56, a near field communication module 58, and a battery 60.

In a preferred embodiment the high performance vibration sensor 42 is an accelerometer that senses the machine's vibration in x, y, and z axes, (e.g., one accelerometer unit measuring in each of the 3 axes; three accelerometers in which each one of the three measure in a respective one axis of the x, y, and z axes.) By high performance, it is meant herein that the vibration sensor has technical specification ratings that meet the metrological requirements for vibration measurements used to perform condition monitoring and diagnosis of the host machine. For a given host machine 12, such requirements are known.

In an example embodiment the high performance vibration sensor 42 provides 3-axis synchronous acquisition with a 50+kS/s rate on each axis (i.e., x, y, and z axes), a 3 dB frequency bandwidth of 10 to 20 kHz on each axis, a signal to noise ratio of 85 to 115 dB and an accuracy of +/−5% at 160 Hz. In a specific embodiment full-scale accelerometer detection is rated at 50 g. The bandwidth, signal to noise ratio, accuracy and other performance specifications may vary in other embodiments.

The low power vibration sensor 44 is a distinct component from the high performance vibration sensor 42. By low power, as used herein in the context of a vibration sensor, it is meant that the vibration sensor draws less than 0.1 µAh of energy from the battery for a 5 second sample of vibration data taken along one axis. In a preferred embodiment, the low power vibration sensor is a MEMS device (e.g., micro-electro mechanical system (in US); micro-electro mechanical machine (in Japan) that draws less than 0.05 µAh of energy from the battery for a 5 second sample of vibration data along the 3 axes. In a more preferred embodiment the low power vibration sensor is a MEMS device that draws less than 0.02 µAh of energy from the battery for such a 5 second sample of vibration data. In an exemplary embodiment, the low power vibration sensor is a MEMS device that draws approximately 0.016 µAh of energy from the battery for such a 5 second sample of vibration data.

The low power temperature sensor 48 draws less than 0.1 µAh of energy from the battery for a temperature sample. In a preferred embodiment, the low power temperature sensor is a MEMS device.

The sensors 42-50 have an electrical connection to a circuit board at which the processor is located so as to be in electrical communication with the processor 52.

The processor 52 executes software made up of computer programs, databases, and other data constructs to define a software processing environment 62. (See FIG. 3.) The processor 52 is configured to activate and control the sensors 42-50 for taking samples of data. In some embodiments the processor 52 also is configured with condition-monitoring software for analyzing collected machine data, and with other software for performing automatic analysis of machine diagnostic data.

The storage 54 preferably is random access memory, flash memory, or nonvolatile memory having a capacity to store a most recent set of raw data collected by the sensors 42-50 for a test point health assessment, along with the results derived therefrom. Further, it is preferred that the storage 54 has the capacity to manage a communication failure during communications with the gateway 16 without a loss of information.

The WMU 14 communicates with the gateway 18 (or another access point; or an interim device, such as a router) through a wireless radio frequency communication module 56. The wireless radio frequency communication module 56 maintains a wireless connection implementing a wireless radio frequency communication protocol, (e.g., IEEE802.15.4e, ISA100.11a, wireless HART; SP100.11a (open standard); ZigBee™; 6LoWPAN (internet task force); a proprietary protocol such as a CyNet™ mesh network from Cyan Technology; a low power wide area network (LPWAN) such as by SIGFOX™; LoRa™; NEUL™; any 3G, 4G, or 5G, protocol; or any of the 802.11 family of standards.)

The near field communication module 58 allows the WMU 14 to link with a nearby near field communication enabled (NFC-enabled) device 20 by establishing radio-communication with the NFC-enabled device by touching them together or bringing them into near proximity, typically a distance of 10 cm (3.9 in) or less. The near field communication module 58 supports a near field communication protocol, such as defined by the ISO/IEC 18092 standard (based on the radio-frequency identification (RFID) standards including ISO/IEC 14443); as defined by other near field communication standards of the near field communication forum; and/or as defined by a near field communication standard(s) of the Groupe Spéciale Mobile Association (GSMA) (e.g., Trusted Services Manager, single wire protocol, testing/certification and secure element protocol.) The processor 52 maintains a near field user interface 66 (see FIG. 3) for displaying command options and results of commands that are processed.

In the current state of the art, a wireless sensor unit, including a high performance sensor and a battery of acceptable size and weight (selected at least in part so as not to interfere with vibration monitoring) which collects a full set of vibration data for a machine control once per day lasts about 3 months before the battery output diminishes to render the sensor unit ineffective. Of concern is that when the battery voltage output diminishes beyond a first threshold voltage, the sensor unit accuracy diminishes. When the battery voltage output diminishes beyond a lower threshold voltage, the sensor unit is unable to obtain and communicate data. Accordingly, the battery voltage output is monitored to determine when to replace the battery. According to a preferred embodiment of the invention, the WMU 14, 17 are controlled to be more efficient than such prior wireless sensor units. In a most preferred embodiment a D-cell battery with a capacity of 17 Ah is used, and provides a battery life of up to 5 years when the WMU is operated to perform one vibration control measure per day at 25° C. ambient using the high performance vibration sensor, one vibration measure every 1-5 minutes using the low power vibration sensor, and one temperature sample every 1-5 minutes using the low power temperature sensor 48. In preferred embodiments batteries of lesser capacity are used which provide a battery life of 1 year or more when the WMU is used as described in this paragraph.

Such preferred and more preferred battery lifetimes are achieved by monitoring the machine's on/off (i.e., running) state and using the high performance sensor 42 to collect diagnostic data only while the machine is running. Measurements done while a machine is not running are useless for condition monitoring purposes, are power consuming, and generate useless traffic on the wireless network.

The low power vibration sensor 44 and the low power temperature sensor 48 are used to detect whether the host machine 12 is running. In selecting such sensors, their lower power requirements are prioritized over their measurement accuracy, so that the preferred (and more preferred) battery lifetime can be achieved. The temperature sensor 48 provides data that allows the processor to discern whether the vibration detected by the low power vibration sensor 44 originates at the local machine 12*a*, or instead is propagating to the local machine from a nearby machine 12*b*/12*c*/12*d*. The temperature sensor 48, for example, may measure the temperature proximal to machine bearings for a WMU 14 installed at a test point 15 corresponding to such bearings.

Software Processing Environment 62

Figure 3:
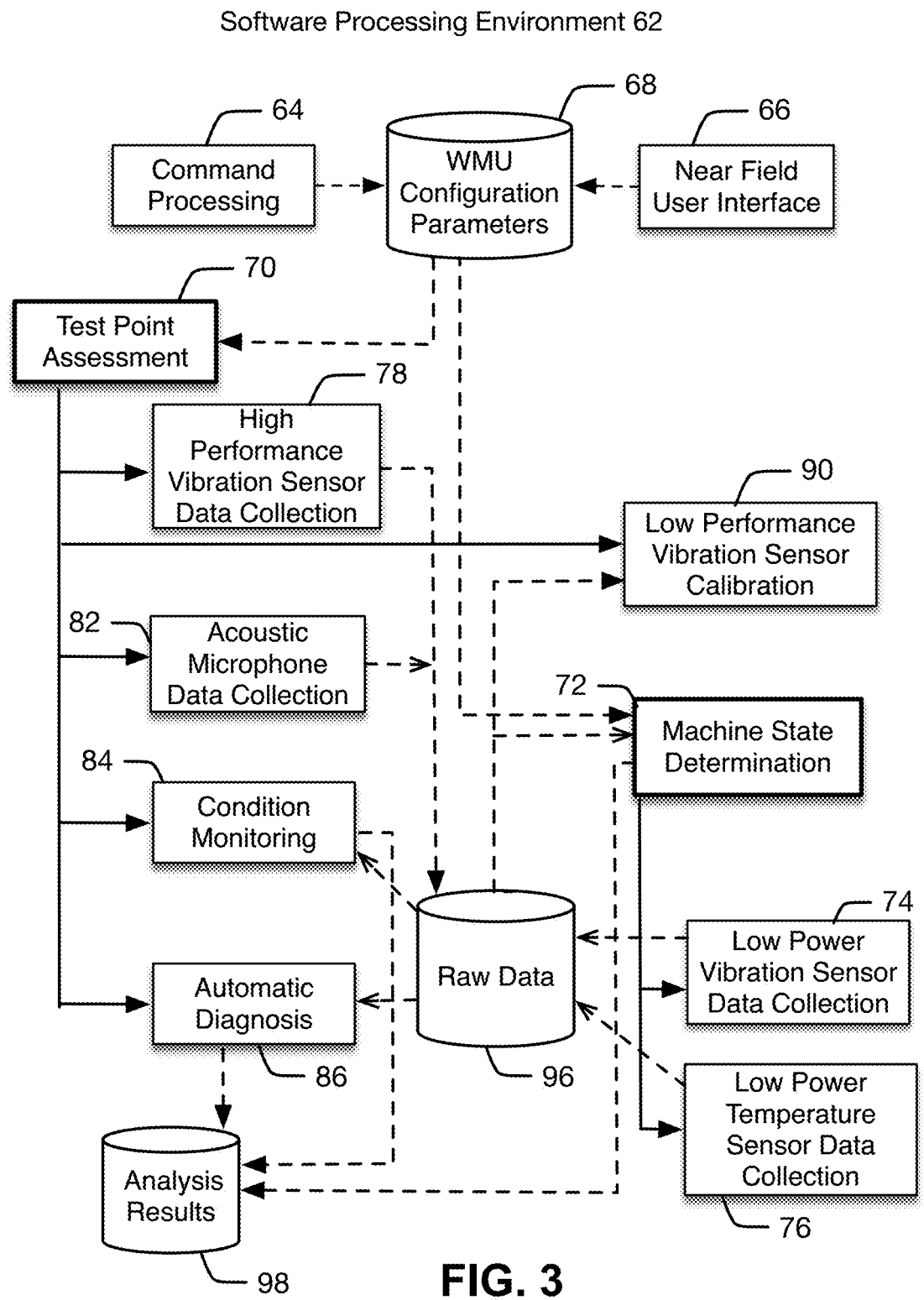
FIG. 3 is a data and control flow diagram of the software processing environment of the processor of the WMU, according to an embodiment of this invention.

Referring to FIG. 3, the processor 52 executes software made up of computer programs, databases, and other data constructs to define the software processing environment 62. The processing environment 62 includes a command processing module 64 for processing commands received from the off-site processing center 34 (or similar onsite center) (via the wireless radio frequency network 18) and from a local user (via a near-field-communication enabled device 20 (NFC-enabled device) (e.g., a smartphone; a tablet computer) and a near-field link 22.) A near-field communication user interface process 66 allows a user operating the NFC-enabled device 20 to request to view data and analysis results; to command that the WMU 14 perform a test point health assessment or other automatic diagnosis and condition monitoring; and to configure the ongoing operations of the wireless monitoring unit (WMU) 14. WMU configuration parameters 68 are set in response to commands from the off-site processing system 34 and NFC-enabled device 20, and are stored in storage 54.

Among the WMU configuration parameters 68 are time intervals or frequencies that define how often various processes are executed. A significant function of the WMU 14 is to collect machine diagnostic data and perform a health assessment of the corresponding test point 15 of the host machine 12*a* at which the WMU 14 is installed. One parameter 68 defines how often such a health assessment is performed for the test point 15 at which the given WMU 14 is installed. Different WMU 14*a*-*c* may have the same or differing time intervals between health assessments for their respective test points 15*a*-15*c*. A typical time interval is once per day, although other time intervals may be used. Another parameter 68 defines how often the machine state is evaluated to determine whether the host machine 12 is running. The machine may be evaluated continuously or at a periodic time interval. A typical time interval is once every 1 second (or a shorter interval) to once every 5 minutes, although other time intervals may be used. Still other parameters 68 determine how the machine state is to be evaluated and whether to include various options—as discussed below in more detail.

In the configuration depicted in FIG. 3 there are two primary processes: the test point assessment process 70 and the machine state determination process 72. In some embodiments, the test point assessment process is a set of health assessment processes, such as a respective health assessment based upon diagnostic data of a given type s (e.g., temperature or vibration) or based upon all types of diagnostic data. Further, a health assessment can include both condition monitoring 84 and automatic diagnosis 86 or a subset thereof. Condition monitoring 84 includes any one or more of the following: detect mass unbalance, misalignment, a mounting defect, moving part looseness, structural resonance, a lubrication defect, rolling element bearings defects (e.g., pitting, general wear), gear defects (e.g., tooth wear, broken tooth, backlash), and cavitation. Automatic diagnosis 86 may include any one or more of vibration level analysis, time wave analysis, spectral analysis, and vector analysis of vibration data and other diagnostic data.

Of significance is that the condition monitoring 84 and automatic diagnosis 86 is based only on data collected from the test point 15 at which the given WMU 14 is installed. This is because the WMU 14 do not communicate with each other. Thus, the data from WMU 14*a* is not shared with WMU 14*b* or 14*c*, thereby limiting the analysis to an assessment for the test point 15*a*, rather than of the entire machine. Consolidation of results obtained by the various WMU 14*a*-*c* installed at a given machine 12*a* is performed by the off-site processing system 34 to complete an analysis at the machine level of analysis. In other embodiments, the WMU 14 installed at a given host machine 12 do communicate with each other. In such other embodiments the WMU 14 may be configured to consolidate the results of the WMU 14*a*-14*c* to perform a health assessment of the host machine 12 as a whole (as distinguished from an assessment just at the test point level of analysis).

The machine state determination process 72 includes a module 74 for collecting a set of vibration data using the low power vibration sensor 44 to obtain a vibration measurement at the test point at which the WMU 14 is installed. In some embodiments, the machine state determination process 72 also includes a module 76 for collecting a temperature sample using the low power temperature sensor 48. In some embodiments, such added feature of temperature measurement is configurable by command (e.g., command processing 64 or near field user interface 66) to be enabled or disabled.

The test point assessment process 70 includes respective modules 78-82 for collecting data from the various sensors to be used in performing a health assessment, (e.g., sensors 42, 48, 50.) The test point assessment process 70 also includes a condition monitoring process 84 and an automatic diagnosis process 86. Raw data 96 is stored in storage 54. Analysis results 98 from the automatic diagnosis 86 and condition monitoring 84 also are stored in storage 54.

In some embodiments, the low power vibration sensor 44 is a low performance vibration sensor 44'. For such embodiments the software processing environment 62 also includes a low performance vibration sensor calibration module 90.

The various modules 70-90 are discussed in more detail below in the operating context of the WMU 14.

Power Efficient Method for Diagnostic Monitoring at a Test Point of a Machine

Figure 4:
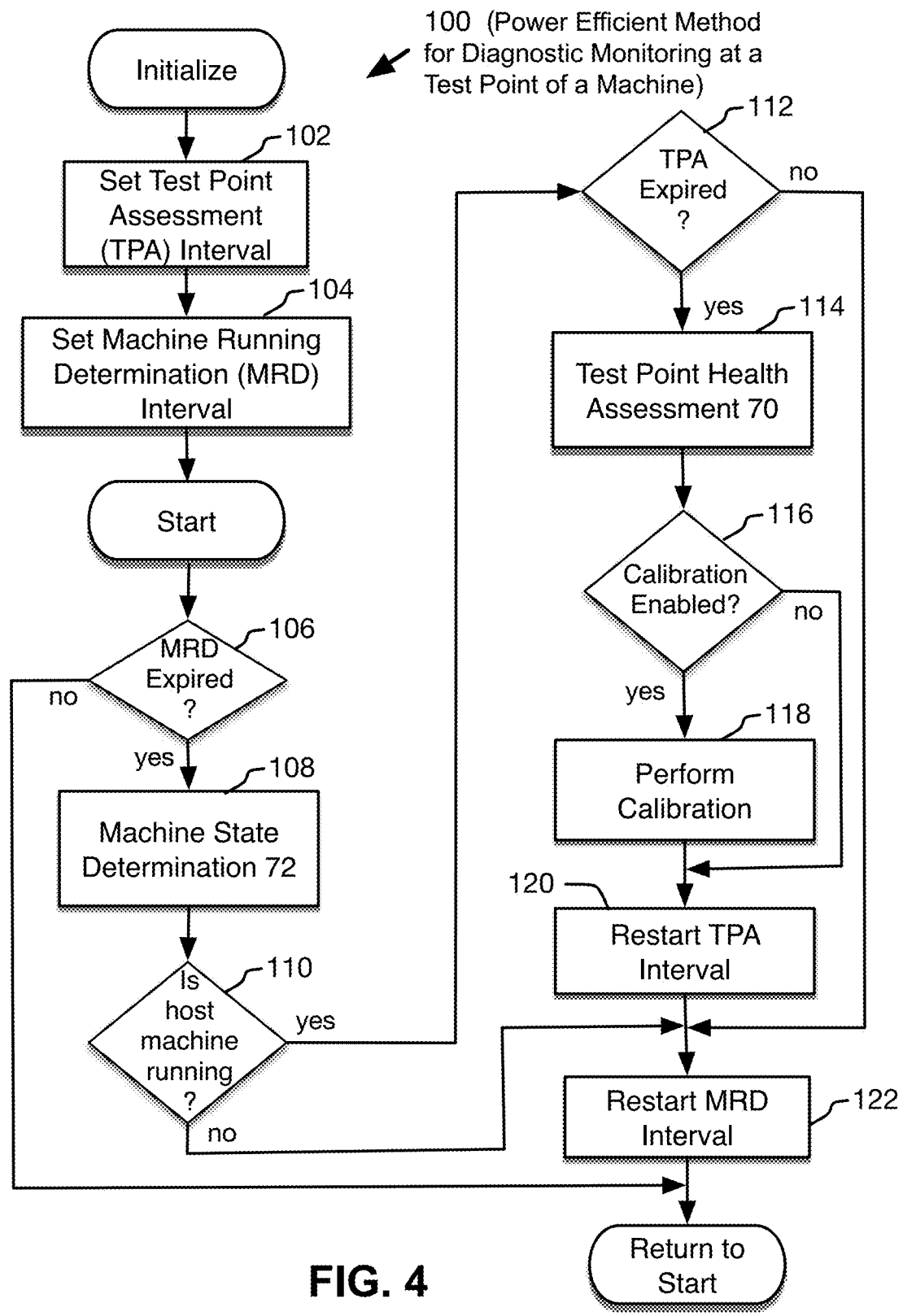
FIG. 4 is a flow chart of a power efficient method for diagnostic monitoring of a test point of a machine, according to an embodiment of this invention.

FIG. 4 is a flow chart of a power efficient method 100 for diagnostic monitoring of a test point 15 of a machine 12*a* using a wireless monitoring unit (WMU) 14*a*. Of significance is that the diagnostic monitoring of the test point 15 is performed periodically—and only when the machine is determined to be running. In particular data acquisition for the assessment is performed only when the host machine 12*a* is running. Configuration parameters include: a time interval or frequency for performing a test point assessment (TPA interval); a time interval of frequency for checking whether the machine 12 is in a state eligible for undergoing a health assessment (e.g., whether the machine is running) (MRD interval); and configuration options, such as for whether to perform calibration, whether temperature sampling is included in the determination of whether the machine is running, and the type of temperature parameter used in the determination of whether the machine is running. The TPA interval and MRD interval are initialized at steps 102 and 104, respectively.

When a MRD interval expires as determined at step 106, the machine state determination process 72 is performed at step 108. The results of that process 72 are checked at step 110. If the host machine 12*a* is determined not to be running, then an MRD timer is reset to the MRD interval time at step 122. The process 100 then continues in its loop to restart at step 106.

If, instead, at step 110 the host machine 12*a* is determined to be running, then a TPA timer is checked at step 112. If the TPA interval has not yet expired, then a test point health assessment is not performed. The MRD timer is reset to the MRD interval time at step 122. The process 100 then continues in its loop to restart at step 106.

If at step 112, the TPA interval is found to have expired, then a test point health assessment 70 is performed at step 114. Whenever a test point assessment is performed in which data is collected from the high performance vibration sensor 42, the corresponding low performance vibration sensor 44' is evaluated to decide whether to recalibrate the low performance vibration sensor 44'. At step 116 the configuration is tested to determine whether calibration is to be performed. If yes, then at step 118 the calibration is performed. A TPA timer then is reset to the TPA interval at step 120, and the MRD timer is reset to the MRD interval time at step 122. The process 100 then continues in its loop to restart at step 106.

Of particular significance to the operation of the WMU 14 is that a test point assessment 70 is automatically performed only using diagnostic data obtained when the most recent execution of the machine state determination 72 found the host machine 12*a* to be running. Accordingly, once the TPA timer expires, a test point assessment is performed the next time the machine is found to be running. In some embodiments, an operator can configure the timing, so that when the TPA time expires, the test point assessment is performed at a specific time period after the machine is found to be running. For example, it may be desirable to let the host machine run for 5 minutes, 30 minutes or even an hour—upon starting up—before performing a test point assessment.

In a preferred embodiment no vibration data of the low performance vibration sensor 44' is used to determine whether vibration evidenced by such vibration data is indicative of a fault condition, alarm condition, or other defect or abnormal operating condition of the host machine 12. No vibration data of the low performance vibration sensor 48' is used to derive a vibration measure analyzed for any vibration-related automatic diagnosis of the host machine 12 or host machine test point 15. In other embodiments vibration data collected from the low performance vibration sensor 44' is used in a preliminary analysis of a condition (e.g. a fault condition, alarm condition, or other defect or abnormal operating condition) or diagnosis (e.g., automatic diagnosis). However, such preliminary analysis is repeated using vibration data from the high performance sensor 42.

Machine State Determination Process 72

Figure 5:
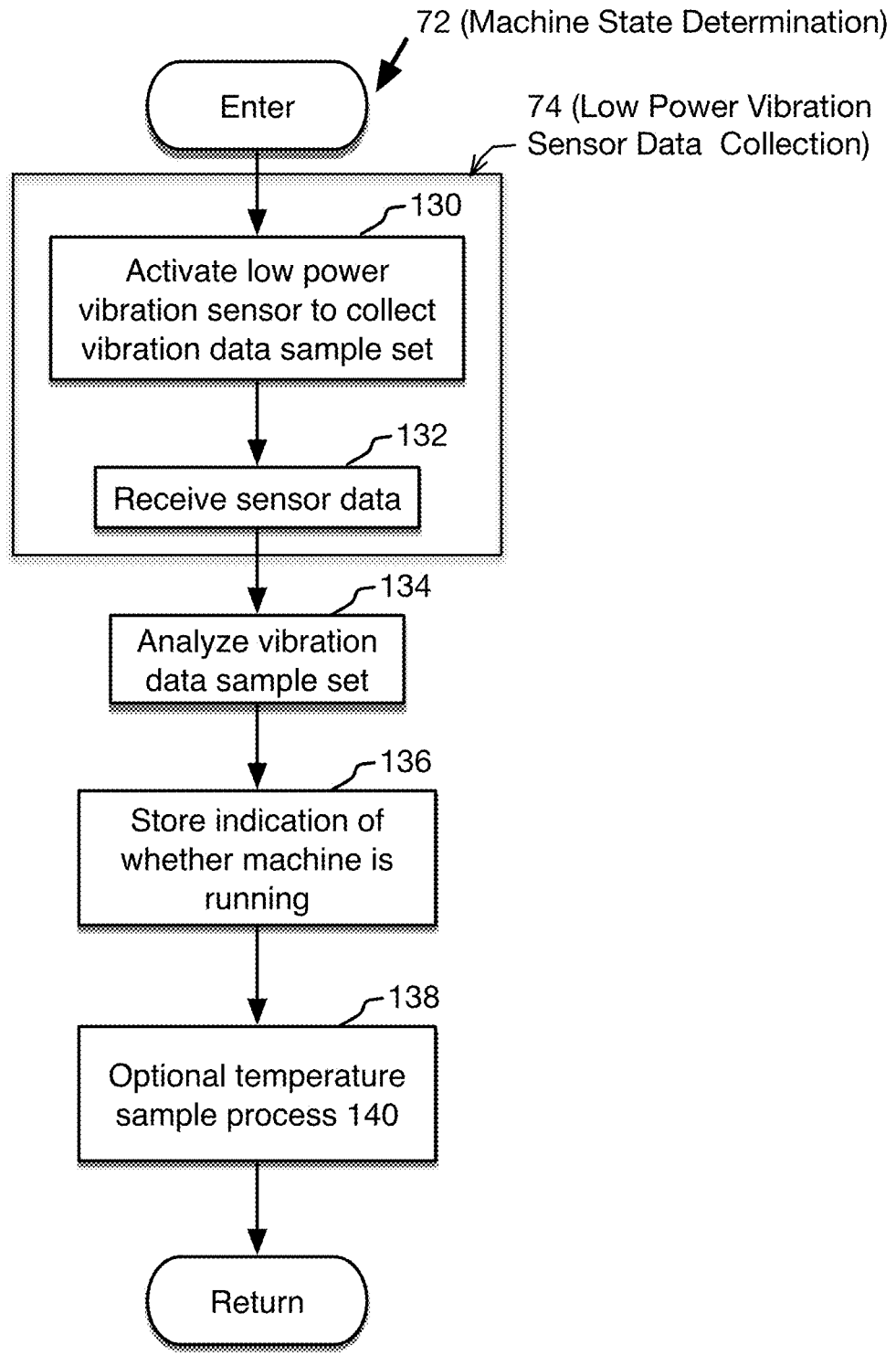
FIG. 5 is a flow chart of a method for determining whether a host machine is running, according to an embodiment of this invention.

FIG. 5 is a flow chart of the machine state determination process 72, according to an embodiment of this invention. At steps 130 and 132 the low power vibration sensor data acquisition process 74 is performed. At step 130, the processor 52 activates the low power vibration sensor 44 to begin sensing vibration. At step 132 the processor receives and stores a time sequence of raw sensor data from sensor 44. The length of time during which a vibration sample is collected for processing by the processor 52 is a configuration parameter that may be set by an operator, (e.g., sent via a command from the off-site processing system 34 or a similar on-site processing system; or from a local operator via near field communication using a NFC-enabled device 20.) At step 134 the raw data is processed. A determination is made based on the analysis of the raw data whether the machine is eligible for undergoing a health assessment, and stored at step 136.

Various tests may be implemented to make a determination that a machine is eligible for a health assessment. In an example embodiment, the machine is in the eligible state when the machine is running. The machine is evaluated to determine whether it is running by computing a mean velocity for the sample interval (e.g., 5 second) for which vibration data is collected. A mean value is preferred to avoid a random shock triggering a determination that the machine 12 is running. If the mean velocity is found to exceed a threshold velocity, then the vibration analysis indicates that the machine is running.

When the host machine 12*a* is stopped (i.e., not running) the vibration should be closed to 0 mm/s. When the machine is running, the vibration for an example machine is approximately 1 mm/s for a healthy machine. However the specific vibration for a given machine is highly dependent on the type and speed of machine and the installation environment. Accordingly, the specific velocity threshold value to distinguish between a stopped machine and a running machine will vary for the host machine, and may be set by the end user by command as a configuration parameter.

In another embodiment, an additional test or alternative test may be implemented in which the mean velocity is compared to the mean velocity computed during a previous iteration of steps 106-110 to detect an evolution of the mean velocity. A threshold percent of change or absolute change is another configuration parameter that is set by command based upon the type of host machine. In a given embodiment both tests are implemented. When either of the tests results in a finding that the machine 12 is running, then the machine state—as based on vibration analysis—is determined to be running.

In various embodiments, any of the following vibration measures can be used to determine whether the machine is running by comparing the measure to a corresponding threshold parameter or change parameter: acceleration, velocity, or displacement. Such measure is any one of an RMS, peak, peak to peak, average or max value measure. Using an average value is desirable to prevent an anomalous shock from providing a false trigger.

Machine State Determination Process 72 with Temperature Check Option

In industrial environments, some machines can be installed next to each other, and the vibrations generated by one machine can propagate to another machine. In order to avoid a false trigger by which the host machine 12*a* is found to be running based on vibrations of a nearby machine 12*b*, 12*c*, or 12*d*, the wireless monitoring unit (WMU) 14 can be configured to also include temperature sensing as part of the machine state determination process 72. In such embodiment, vibration information sensed by the low power vibration sensor 44 is correlated with the deviation of temperature measured by the low power temperature sensor 48.

Due to the numerous machine applications occurring in industry (e.g., cooling system in place, cryogenic pumps, outdoor installation under the sun), the temperature response can be very different from one machine to another or from one bearing to another bearing of a given machine. The time required for the low power temperature sensor 48 to sense temperature also will vary according to the type of mounting (e.g., stud, mounting accessory for triaxial positioning, magnet). As a result, there are several configuration parameters set by command to implement a configuration in which temperature sensing is used with vibration sensing to detect whether the machine is running. When the temperature sensing option is available, and when such option is enabled, the low power temperature sensor 48 is used to gather temperature data at step 138. (See FIG. 5.)

When the machine is stopped, the typical temperature is the ambient temperature, (e.g., 25° C.) When the machine is running, an exemplary bearing temperature is 45-50° C., although the specific temperature will depend on the machine. In an example embodiment, the parameters need not be configured to detect the immediate transition of the machine from a stopped state to a running state. It is acceptable for determining the machine running state in a manner that assures that the machine is running when the full health assessment is to be performed. Accordingly, in some embodiments temperature evolution is used to identify that the machine is running. The speed of evolution of the temperature measured may however vary depending on the machine material and environment, which is why if a difference in T° is set as parameter to validate the change of status of the machine, it preferably is to be configurable by the user (delta time and delta temperature). As a result, there can be a delay from the time at which the machine transitions from stopped to running to the time at which the WMU determines that the machine is running. The delay being referred to here is not due to the delay between repetitions of the machine running state determination process (e.g., set at 1-5 minutes). The delay referred to here is when WMU performs the machine state determination process, and finds that the machine is not running when it actually is running. That false negative is acceptable and is due to the machine recently transitioning from stopped to running. During a later repetition, the false negative will change to a true positive. The latency will depend on the threshold parameters used for the temperature analysis.

Figure 6:
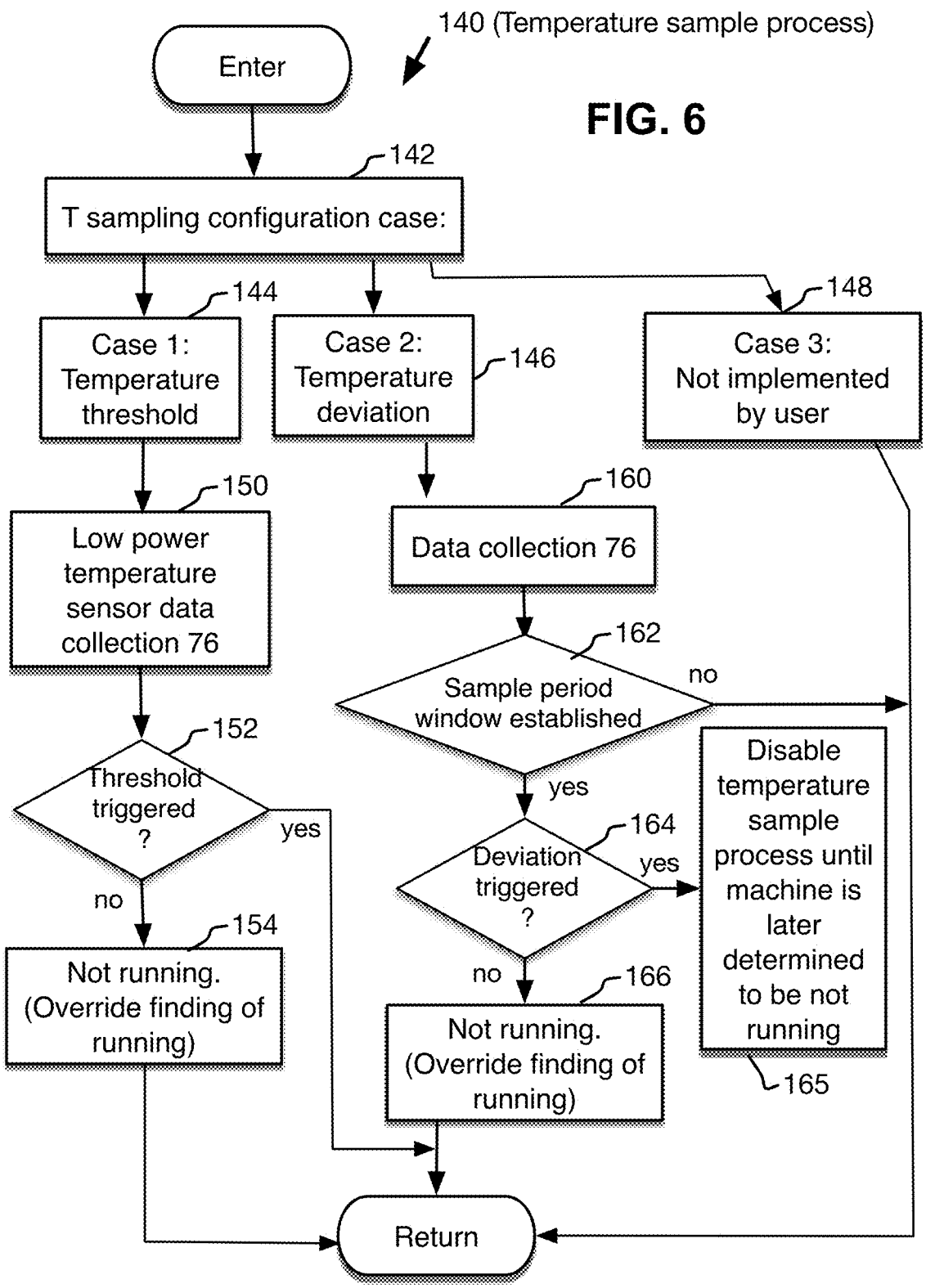
FIG. 6 is a flow chart of a method for sampling temperature used in determining whether a machine is running, according to an embodiment of this invention.

During the machine state determination process 72, at step 138 the temperature sample process 140 may be executed. FIG. 6 is a flow chart of an embodiment of the temperature sample process 140. At step 142 a case evaluation is executed. If the temperature sampling is not enabled for the machine running the determination analysis (e.g., case 3 at step 148), then the process returns without providing any temperature-based analysis for the determination of whether the machine 12 is running.

Case 1 (starting at step 144) corresponds to a configuration in which a temperature threshold test is used. Case 2 (starting at step 146) corresponds to a case at which a temperature deviation is used. Referring to case 1, at step 150 the low power temperature sensor data acquisition process 76 is executed. The processor 52 activates the sensor 48 to collect temperature data. A single sample or a time-averaged sample is used as the temperature measure. The temperature measure is compared to a threshold temperature value. The specific threshold temperature is a configuration parameter set by command for the given machine 12. In addition the specific test is set by command as a configuration parameter. For some machines the test is whether the temperature measure exceeds the threshold temperature. For other machines (e.g., where test point 15 gets colder during machine operation) the test is whether the temperature measure is less than the threshold temperature. At step 152 the temperature measure is compared to the threshold temperature. If the threshold is triggered (e.g., for a test of being less, the measured temperature is found to be less than the threshold temperature; for a test of being greater, the measured temperature is found to be greater than the threshold temperature), the result is supportive of a finding that the machine is running. If the threshold is not triggered, then the result does not support a finding that the machine is running. At step 154 the finding that the temperature measure does not support a finding that the machine is running overrides a finding based on vibration, so that the machine state determination process 72 indicates that the machine 12 is not running, (e.g., step 110 result is machine is not running.)

Case 2 (starting at step 146) corresponds to a case at which a temperature deviation is used. For such case, the time period for collecting temperature data, the temperature deviation threshold, and the direction of temperature deviation are configuration parameters set by command according to the type of machine 12. The direction of temperature deviation is used to distinguish between a machine that is running and a machine that has recently been turned off, so that for example a machine that is cooling off after having been running hot does not trigger a finding of temperature deviation supporting a determination that the machine is running.

Referring to case 2, at step 160 the low power temperature sensor data acquisition process 76 is executed. The processor 52 activates the sensor 48 to collect temperature data. Initially, a single sample or a single time-averaged sample may be detected. Samples are to be collected over a predetermined window of time (e.g., 10 minutes, 30 minutes, 1 hour), according to the configured parameter for the time period of collecting temperature data. Thus, a rolling time window of temperature measures is being obtained. Once the window is found to be established at step 162, then at step 163 analysis of the temperature measures is performed. The analysis computes the temperature deviation of the temperature measures that have occurred during the current period of the rolling time window. At step 164 the computed temperature deviation is compared to the temperature deviation threshold, (e.g., 5° C.) The specific deviation threshold may vary according to the machine. If the temperature deviation threshold is triggered, (e.g., temperature deviation exceeds the temperature deviation threshold), then the analysis supports an indication that the machine is running. Accordingly, the vibration analysis result stored at step 136 (FIG. 5) is not overridden. After a determination at 164 that the machine is running, at step 165 the temperature sample process 140 is disabled until the machine is later found not to be running. This is because the deviation does not necessarily continue once an operating temperature is achieved for test point 15 of the host machine.

If at step 164 the temperature deviation threshold is not triggered, (e.g., temperature deviation does not exceed the temperature deviation threshold), then the analysis supports an indication that the machine is not running. Accordingly, the vibration analysis result stored at step 136 (FIG. 5), if indicating that the machine is running, is overridden.

Method for Recalibrating Low Performance Vibration Sensor

In an exemplary embodiment, the low power vibration sensor 44 is a low performance vibration sensor 44'. Because the high quality vibration sensor 42 provides better metrological performance and more accuracy in terms of calibration stability, the calibration deviation is assessed by comparing the low quality vibration sensor measurements to the high quality vibration sensor measurements. A reference measurement is performed upon installation of the WMU 14 to attain an initial calibration factor. The correction factor (CF) thereafter is automatically adjusted so that the accuracy of the low quality accelerometer is maintained over time. According to the methods described above, the low performance vibration sensor 44' measures vibration more frequently than the high performance vibrations sensor 42. In an example embodiment, a low performance vibration sensor calibration process 90 (see FIG. 3) is performed each time a set of data is collected from the high performance vibration sensor 42.

The initial correction factor CF is determined at system startup. A sample set of vibration data is collected by the low performance vibration sensor 44'. In an example embodiment a mean value of the overall velocity in mm/s on a prescribed frequency bandwidth (e.g., @3 dB) is computed for the low quality vibration sensor. At the same time a corresponding sample set of vibration data is collected by the high performance vibration sensor 42. A mean value of the overall velocity in mm/s on the prescribed frequency bandwidth (e.g., @3 dB) is computed for the high performance sensor. Initially, the correction factor, CF, is defined by equation (1) below:

$$CF = V_{avg}(S_{HPV})/V_{avg}(S_{LPV}) \quad (1)$$

Where, $V_{avg}(S_{HPV})$=the mean value of the overall velocity in mm/s on the prescribed frequency bandwidth is computed for the high performance sensor 42;

$V_{avg}(S_{LPV})$=the mean value of the overall velocity in mm/s on the prescribed frequency bandwidth is computed for the low performance sensor 44'.

Thereafter, for each measurement made by the low performance vibration sensor 44' in process 74 (see FIGS. 3 and 5), the reading is adjusted by the correction factor, CF, according to equation 2:

$$V_{adj}(S_{LPV}) = CF * V_{current}(S_{LPV})$$

Where, $V_{current}(S_{LPV})$=the mean value of the overall velocity in mm/s on the prescribed frequency bandwidth currently computed using the most recent vibration data collected with the low performance sensor; and $V_{adj}(S_{LPV})$ is the adjusted velocity based upon the correction factor.

Each time the high performance vibration sensor 42 collects data for a test point health assessment 70 (e.g., see data acquisition process 78 of FIG. 3), the correction factor, CF, is tested to determine whether it needs to be updated. Alternatively, the correction factor is tested periodically at a period determined by a corresponding configuration parameter (specifying such time period). As with the other configuration parameters, the value may be set by command. Such time period typically is the same as the TPA interval. Although in some embodiments, such values may differ.

Figure 7:
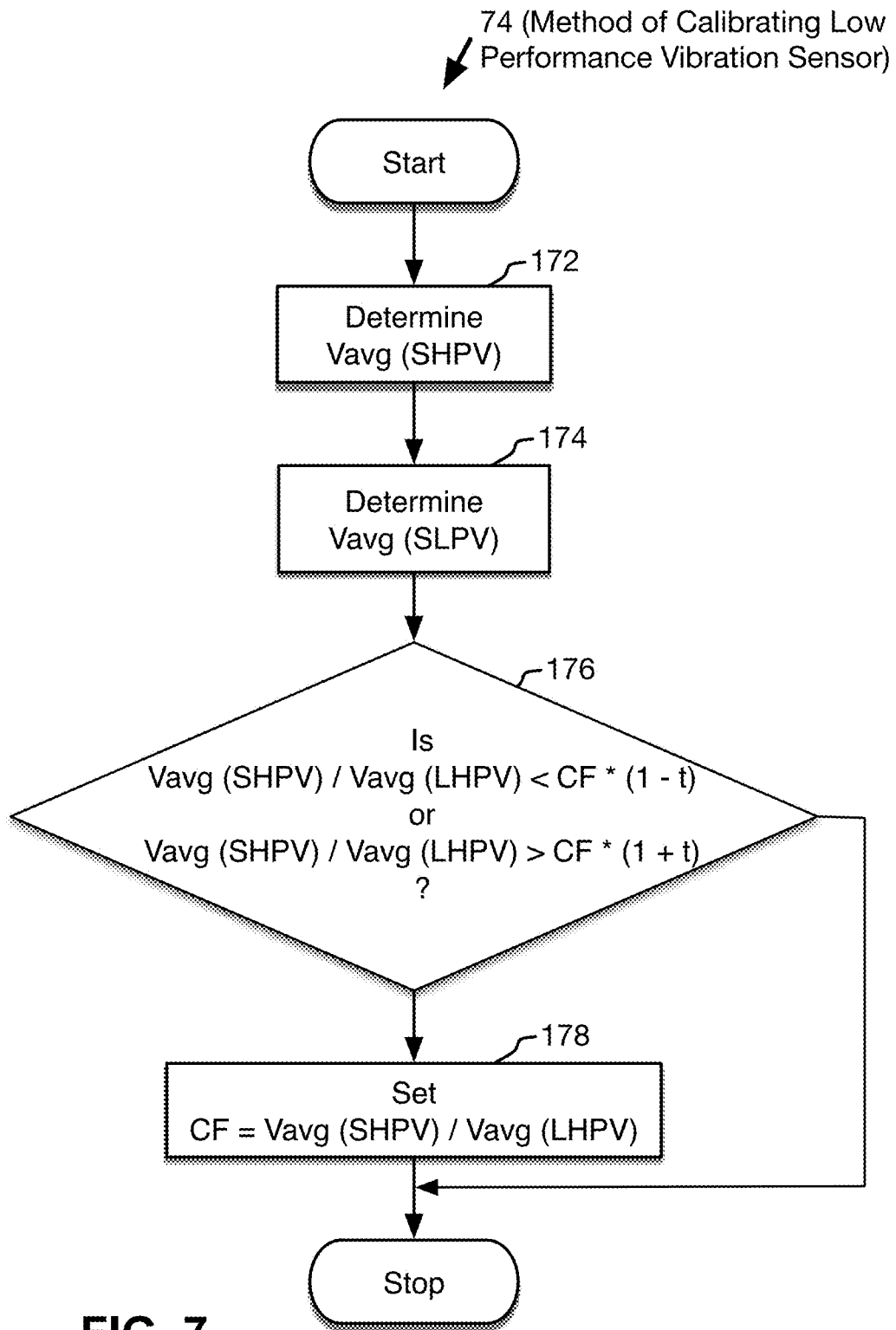
FIG. 7 is a flow chart of a method for automatically recalibrating the low performance vibration sensor, according to an embodiment of this invention.

To monitor and perform calibration, the processor 32 executes the low performance vibration calibration process 90. FIG. 7 is a flow chart of such process 90. At step 172, the mean value ($V_{avg}(S_{HPV})$) of the overall velocity in mm/s on the prescribed frequency bandwidth (e.g., @3 dB) using vibration data most recently collected by the high performance vibration sensor 42 is accessed (if already derived), or calculated (if not yet derived), by the processor 32. At step 174, the mean value ($V_{avg}(S_{LPV})$) of the overall velocity in mm/s on the prescribed frequency bandwidth using vibration data most recently collected by the low performance vibration sensor 44' is accessed (if already derived), or calculated (if not yet derived), by the processor 32.

At step 176, the ratio of such values (i.e., current correlation) is compared to the established correction factor to determine whether the correlation of measurements of the low performance vibration sensor 44' has drifted relative to the high performance vibration sensor 42 by such an amount that a new correction factor is to be used. The tolerance, t, for determining whether the correction factor needs to be reset is another configuration parameter. In an example embodiment the tolerance factor is 0.05, although in other embodiments different tolerance factors may be used.

If the current correlation differs from the established correction factor by +/−t, then at step 178, the correction factor is updated to be the current correlation, (i.e., $V_{avg}(S_{HPV})/V_{avg}(S_{LPV})$.) The newly established correction factor CF is stored in storage 54 and used during the next execution of process 90 as the established correction factor.

In some embodiments, each data sample (e.g., vibration data) is time stamped, so that respective data collected closest in time may be used during the calibration process. The low performance vibration sensor calibration 90 is performed using data from the low performance vibration sensor 44' obtained nearest in time to the data collected by the high performance vibration sensor 42. In some embodiments, the processor 52 is configured to activate the low performance vibration sensor 44' and obtain data from the low performance vibration sensor 44' at the same time as for the high performance vibration sensor 42 during a test point assessment, so as to assure that the data used for calibration is in time correlation.

Condition Monitoring and Automatic Diagnosis

In some embodiments condition monitoring and automatic assessment are performed as part of a full assessment. In some embodiments a reduced assessment is performed as a preliminary assessment to determine whether to perform a full assessment. The reduced assessment is performed more often, but is based on a smaller set of indicators. In an example embodiment one indicator, overall velocity, is used as the reduced set of indicators. Detailed descriptions of a reduced assessment, full assessment, and automatic diagnosis are found in the related specification of Wascat et al., "Power-Efficient Data-Load-Efficient Method of Wirelessly Monitoring Rotating Machines." Further details of the activities included within the meaning of automatic diagnosis are found in the related specification of Wascat et al., "Automatic Rotating-Machine Fault Diagnosis With Confidence Level Indication."

Alternative Embodiment

In some embodiments there are a plurality of WMU 14 installed on a host machine 12 at respective test points 15 of the machine. Each WMU 14 may be configured with the low power vibration sensor 44. Accordingly, in some embodiments each WMU 14 is operated to perform an independent machine state determination process 72. In other embodiments, one WMU 14a is set to be a "master WMU" and is the only WMU 14a activated to perform the machine state determination process 72. The master MWU communicates the machine state determination to other WMU, such as through the gateway 16, or directly such as by using the capabilities of the ISA100.11a protocol (i.e., a mesh network providing communication between WMU.) In one embodiment the machine state determination (i.e., running or not running) is sent after every iteration of the process 72. In other embodiments, the machine state determination is sent periodically at a less frequent rate than for every iteration. In still other embodiments, the machine state determination is sent periodically at a less frequent rate than for every iteration, plus after each iteration during which the machine is determined to be running.

OTHER REMARKS

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A wireless monitoring unit that performs condition monitoring associated with a test point location of a host machine, comprising:
    a first sensor that is a vibration sensor;
    a second sensor, different from the first sensor, that is a low power, low performance vibration sensor; and
    a processor configured to control activity of the first sensor and the second sensor, so that the first sensor is activated to collect vibration data only during times for which the processor has determined, using vibration data collected by the second sensor, that the host machine is in a state eligible for undergoing a health assessment; and
    wherein the processor is configured to perform condition monitoring and automatic diagnosis associated with the first test point location for a health assessment of the host machine using vibration data collected by the first sensor; and
    wherein the processor is configured to perform:
    sampling the second sensor to obtain a second set of vibration data;
    analyzing the second set of vibration data to evaluate whether the host machine is in said eligible state;
    repeating said sampling and analyzing periodically;
    activating the first sensor to collect vibration data only during times for which said analyzing finds the host machine to be in said eligible state;
    performing said condition monitoring using a first set of vibration data collected by the first sensor; and
    repeating said activating and said performing less frequently than said repeating of said sampling and analyzing.

2. The wireless monitoring unit of claim 1, wherein the processor is further configured to calibrate the second sensor using vibration data collected by the second sensor and vibration data collected by the first sensor that corresponds in time with the vibration data collected by the second sensor.

3. The wireless monitoring unit of claim 1, wherein the processor is further configured to perform transmitting an indication that the host machine is running to a second wireless monitoring unit installed at a second test point of the host machine.

4. The wireless monitoring unit of claim 3, wherein the second wireless monitoring unit comprises:
    a vibration sensor; and
    a processor configured to perform condition monitoring in response to the second wireless monitoring unit receiving the indication that the host machine is running.

5. The wireless monitoring unit of claim 3, wherein said transmitting is performed for each repetition of said analyzing for which the processor finds that the host machine is running.

6. The wireless monitoring unit of claim 3, wherein said transmitting is performed for each n-th repetition of said analyzing for which the processor finds that the host machine is running, n being an integer greater than one.

7. The wireless monitoring unit of claim 1, wherein there is no vibration data collected by the second sensor that is used by the processor to evaluate any fault condition, any alarm condition, or any other defect condition of the host machine.

8. The wireless monitoring unit of claim 1, wherein the processor is further configured to perform:
    calculating a calibration factor using vibration data collected by the second sensor and vibration data collected by the first sensor that corresponds in time with the vibration data collected by the second sensor; and
    adjusting a vibration measure derived from vibration data obtained with the second sensor using the calibration factor.

9. The wireless monitoring unit of claim 8,
    wherein the calibration factor is an established calibration factor, and the processor is further configured to perform:
    calculating a potential calibration factor using a current set of vibration data collected by the second sensor and a current set of vibration data collected by the first sensor that corresponds in time with the vibration data collected by the second sensor, and
    updating the established calibration factor to be the potential calibration factor whenever the potential calibration factor deviates from the established calibration factor by at least a predetermined tolerance.

10. The wireless monitoring unit of claim 8,
    wherein the calibration factor is a ratio of a first value and a second value,
    in which the first value is a mean value of an overall velocity on a prescribed frequency bandwidth computed for the vibration data collected by the first sensor, and
    in which the second value is a mean value of an overall velocity on a prescribed frequency bandwidth computed for the vibration data collected by the second sensor.

11. The wireless monitoring unit of claim 1, further comprising:
    a first communication module configured for wireless communication;
    non-volatile memory having a capacity for storing at least one set of measurement data collected for performing condition monitoring associated with the first test point location as part of the health assessment; and
a battery; and
wherein the health assessment of the host machine encompasses condition monitoring associated with one or more test points of the host machine;
wherein the first sensor detects vibration in multiple axes; and
wherein the second sensor has a power requirement of less than 0.1 .mu.Ah for a 5 second measurement sample of vibration data.

12. The wireless monitoring unit of claim 11, further comprising a near field communication module configured for wireless communication with a near field communication enabled device within a near field communication range using a near field communication protocol.

13. The wireless monitoring unit of claim 1, wherein the second vibration sensor has technical specification ratings which do not meet metrological requirements for vibration measurements used to perform condition monitoring and diagnosis of the host machine; and
wherein the processor is configured to calibrate the second vibration sensor using vibration data collected by the second sensor and vibration data collected by the first sensor that corresponds in time with the vibration data collected by the second sensor.

14. The wireless monitoring unit of claim 1, further comprising a temperature sensor, and wherein the processor is further configured so that said analyzing includes evaluating data collected by the temperature sensor to attribute whether vibration sensed by the second sensor is due to the host machine running, as distinguished from being due to vibration from another machine propagating to the host machine causing the host machine to vibrate while the host machine is not running; and
wherein said processor is configured to determine that the host machine is not running when the processor determines that a temperature deviation measure, obtained over time with the temperature sensor, does not exceed a temperature deviation threshold, even though vibration sensed by the second sensor is indicative to the processor of the machine running.

15. The wireless monitoring unit of claim 1, further comprising a temperature sensor, and wherein the processor is further configured so that said analyzing includes evaluating data collected by the temperature sensor to attribute whether vibration sensed by the second sensor is due to the host machine running, as distinguished from being due to vibration from another machine propagating to the host machine causing the host machine to vibrate while the host machine is not running; and
wherein said processor is configured to determine that the host machine is not running when the processor determines that a temperature measure, obtained with the temperature sensor, does not trigger a temperature threshold, even though vibration sensed by the second sensor is indicative to the processor of the machine running.

16. A wireless monitoring unit that performs condition monitoring associated with a test point location of a host machine, comprising:
a first sensor that is a vibration sensor;
a second sensor, different from the first sensor, that is a low power, low performance vibration sensor; and
a processor configured to control activity of the first sensor and the second sensor, so that the first sensor is activated to collect vibration data only during times for which the processor has determined, using vibration data collected by the second sensor, that the host machine is in a state eligible for undergoing a health assessment; and
wherein the processor is configured to perform condition monitoring and automatic diagnosis associated with the first test point location for a health assessment of the host machine using vibration data collected by the first sensor; and
further comprising a temperature sensor, and wherein the processor is further configured so that said analyzing includes evaluating data collected by the temperature sensor to attribute whether vibration sensed by the second sensor is due to the host machine running, as distinguished from being due to vibration from another machine propagating to the host machine causing the host machine to vibrate while the host machine is not running.

17. The wireless monitoring unit of claim 16, wherein said processor is configured to determine that the host machine is not running when the processor determines that a temperature deviation measure, obtained over time with the temperature sensor, does not exceed a temperature deviation threshold, even though vibration sensed by the second sensor is indicative to the processor of the machine running.

18. The wireless monitoring unit of claim 16, wherein said processor is configured to determine that the host machine is not running when the processor determines that a temperature measure, obtained with the temperature sensor, does not trigger a temperature threshold, even though vibration sensed by the second sensor is indicative to the processor of the machine running.

19. A wireless monitoring unit that performs condition monitoring associated with a test point location of a host machine, comprising:
a first sensor that is a vibration sensor;
a second sensor, different from the first sensor, that is a low power, low performance vibration sensor; and
a processor configured to control activity of the first sensor and the second sensor, so that the first sensor is activated to collect vibration data only during times for which the processor has determined, using vibration data collected by the second sensor, that the host machine is in a state eligible for undergoing a health assessment;
wherein the processor is configured to perform condition monitoring and automatic diagnosis associated with the first test point location for a health assessment of the host machine using vibration data collected by the first sensor;
wherein the processor is further configured to perform:
calculating a calibration factor using vibration data collected by the second sensor and vibration data collected by the first sensor that corresponds in time with the vibration data collected by the second sensor; and
adjusting a vibration measure derived from vibration data obtained with the second sensor using the calibration factor; and
wherein the calibration factor is an established calibration factor, and the processor is further configured to perform:
calculating a potential calibration factor using a current set of vibration data collected by the second sensor and a current set of vibration data collected by the first sensor that corresponds in time with the vibration data collected by the second sensor, and updating the established calibration factor to be the potential calibration factor whenever the potential calibration factor deviates from the established calibration factor by at least a predetermined tolerance.

20. A wireless monitoring unit that performs condition monitoring associated with a test point location of a host machine, comprising:

a first sensor that is a vibration sensor;

a second sensor, different from the first sensor, that is a low power, low performance vibration sensor; and a processor configured to control activity of the first sensor and the second sensor, so that the first sensor is activated to collect vibration data only during times for which the processor has determined, using vibration data collected by the second sensor, that the host machine is in a state eligible for undergoing a health assessment;

wherein the processor is configured to perform condition monitoring and automatic diagnosis associated with the first test point location for a health assessment of the host machine using vibration data collected by the first sensor;

wherein the processor is further configured to perform:

calculating a calibration factor using vibration data collected by the second sensor and vibration data collected by the first sensor that corresponds in time with the vibration data collected by the second sensor; and adjusting a vibration measure derived from vibration data obtained with the second sensor using the calibration factor; and wherein the calibration factor is a ratio of a first value and a second value, in which the first value is a mean value of an overall velocity on a prescribed frequency bandwidth computed for the vibration data collected by the first sensor, and in which the second value is a mean value of an overall velocity on a prescribed frequency bandwidth computed for the vibration data collected by the second sensor.

* * * * *